April 12, 1960     A. MEUTSCH     2,932,551
BRIQUETTE MOLD
Filed July 14, 1958     2 Sheets-Sheet 1
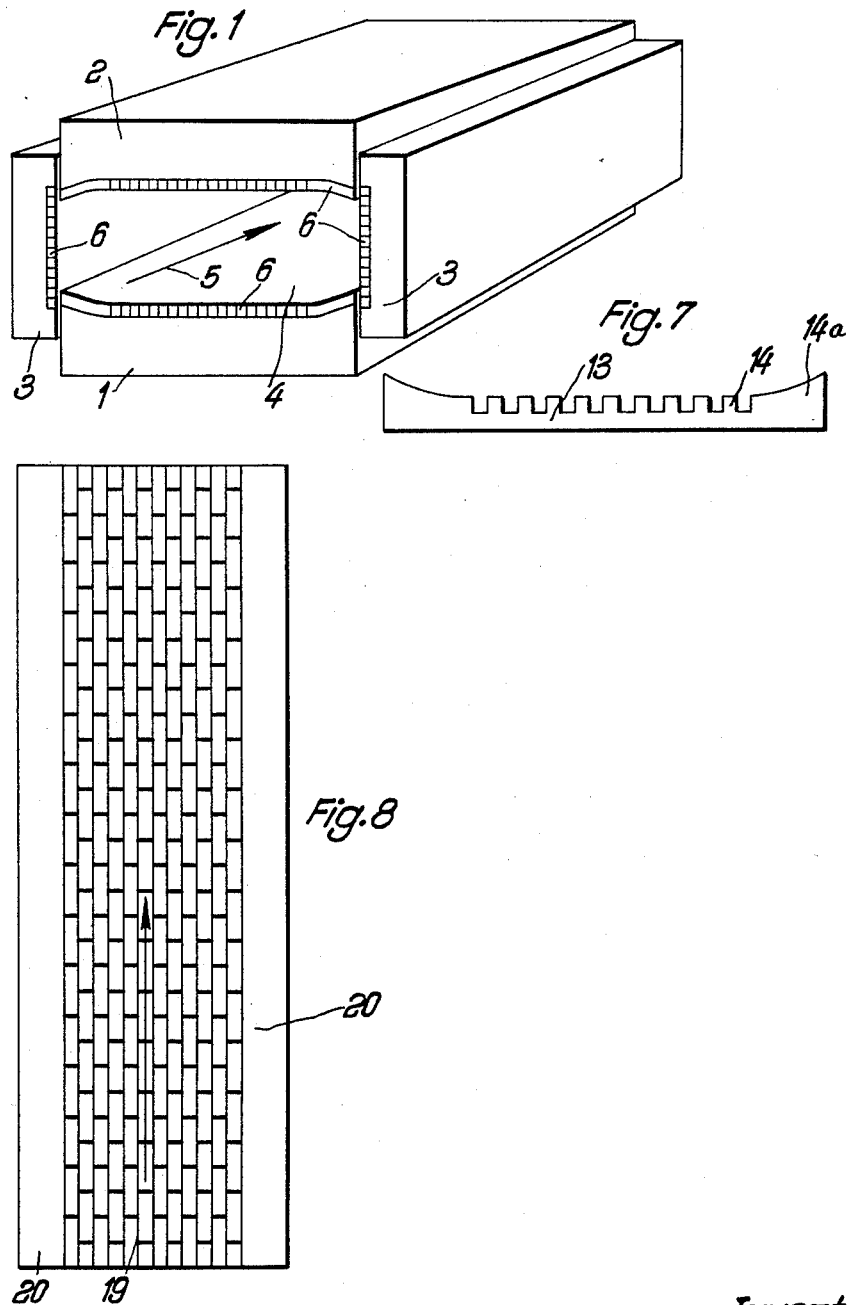
Inventor:
ADOLF MEUTSCH
by Mestern & Kollin
ATTORNEYS April 12, 1960   A. MEUTSCH   2,932,551
BRIQUETTE MOLD
Filed July 14, 1958   2 Sheets-Sheet 2
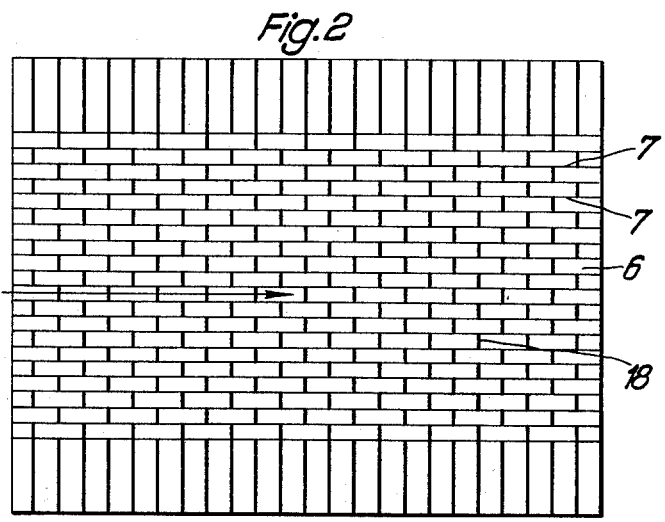
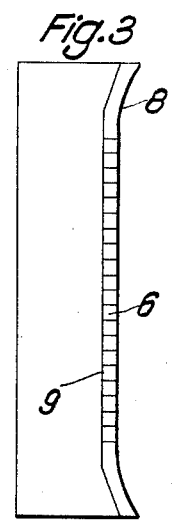
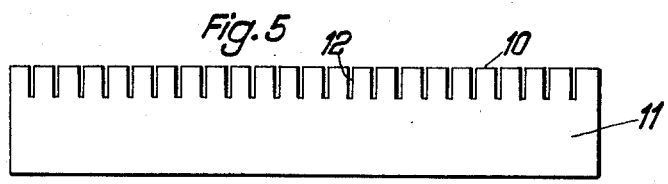
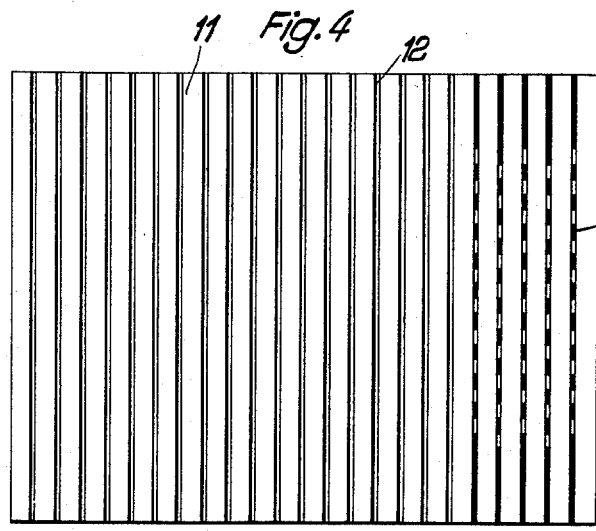
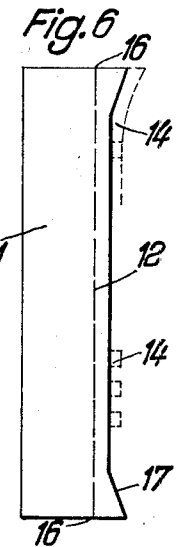
Inventor:
ADOLF MEUTSCH
by Mestern & Kollin
ATTORNEYS

United States Patent Office 2,932,551
Patented Apr. 12, 1960

2,932,551

BRIQUETTE MOLD

Adolf Meutsch, Essen-Bredeney, Germany, assignor to Wallram Hartmetall G.m.b.H., Essen, Germany Application July 14, 1958, Serial No. 748,189

4 Claims. (Cl. 18—47)

This invention relates to a briquette mold which is laminated of several distinctive layers and is of improved resistance to wear.

For the manufacture of briquettes from hard or soft coal, particularly in extruders, molds usually are employed which are made from manganese steel and consist of a multi-sectional mold and of the die. The powdered coal to be briquetted wears strongly on the mold so that frequent regrinding or replacement of these molds after a comparatively short period of time is required. In order to minimize breakage of brittle hardened mold material, excessive wear and the drawbacks encountered due to scale and segregated particles in the ground coal, resulting in the formation of grooves, it has been suggested to line the joints of the mold with laminated layers of thin sheet steel, disposed at right angles to the working direction of the die. It has further been suggested to use laminates intermittently consisting of sheet metal and of wear-resistant non-metallic materials, preferably emery. The steel is thought to provide the mechanical strength (pressure load), and the emery to resist wear. This arrangement, however, has not been found adequate because it cannot be avoided that the emery layers are subjected to the same stress and pressure load as the metal layers so that the steel layers are subjected to wear by the emery, and the emery, in turn, tends to crumble and thereby to exert an abrasive action. These molds do not wear better than those made from rolled steel, in fact, they have a shorter working life.

Other suggestions have been made whereby the portions of the molds subjected to the highest wear are reinforced by welding wear-resistant materials onto them. Materials used are, e.g., tungsten carbide together with low-melting alloy metals, such as cobalt, chromium, manganese and others. However, although these welds decrease the wear, they have the disadvantage of tending toward formation of cracks, due to the differences in expansion on heating and to shrinkage. This occurs as early as on cooling of the weld, and later in operation or while regrinding the molds. More ductile materials have insufficient working life.

The same drawback is incurred with mold materials which consist of laminates which are interconnected by welding, riveting or in a similar manner and which are disposed in a direction parallel to the direction of the moving briquettes.

The present invention overcomes the above-mentioned disadvantages in that the lamellae of the laminate, disposed in a known manner in the mold direction and connected to the surface of the mold, are rectangular hard metal rods of a shorter length than the mold, and are soldered to each other as well as to the mold. They are disposed in such a manner that their joints, running in a right angle to the mold direction, are staggered. Preferably, the joints running at right angles are provided with interlayers consisting of a material which wears faster than the highly wear-resistant material of the metal bars.

The joints running at right angles to the mold direction and, if desired, also the joints running parallel, between the mold pieces are hollowed in such a manner that they can be filled with coal particles.

A preferred embodiment of the present invention is illustrated in the accompanying drawings. However, it should be understood that these are presented merely by way of explanation, not of limitation, and that many changes may be made in the details without departing from the spirit of the invention.

In the drawings,

Fig. 1 is a perspective view of a short mold for extrusion;

Fig. 2 is a plan view of the lower mold;

Fig. 3 is a side view of Fig. 2;

Figs. 4–6 are plan view and side views, respectively, of a prepared base of the lower mold;

Fig. 7 is a laminate layer of sheet iron;

Fig. 8 is an interior view of a reinforced plate.

Referring now to these drawings, the briquette molds shown in Fig. 1, consist of a lower part 1, an upper part 2 and the lateral plates 3. During the molding cycle, the powdered coal and, subsequently, the die is introduced into the hollow space 4 in the mold direction 5. In order to increase the wear resistance, the inner surfaces, serving to impart the proper shape, are lined with a plurality of regularly shaped, rectangular mold pieces 6, made of hard metal, which are shorter than the mold. These metal bars or rods are soldered or welded to the corresponding part of the mold, i.e., the upper or the lower part, respectively. The mold pieces 6 are set in the mold in such a manner that their joints are staggered. These joints are in a rectangular direction to that of the molding direction shown by the arrow.

The rectangular mold pieces preferably are of a square cross-section (Fig. 3), whose length is a multiple of the width and whose larger expansion is in the same direction as the working direction of the die.

The edge pieces 8 which have, in the plan view (Fig. 2), a square or rectangular shape, are slightly arched in conformance with the desired rounded shape of the finished briquette, as shown in Fig. 3. The mold pieces are soldered or welded to each other at the contact areas 7 and also to the base mold 11.

In order to attain a better shaping resistance in the mold, the base mold 11 (Figs. 4–6) is provided with narrow slits 12 which are disposed at right angles, and preferably vertically, to the molding direction of the die and in regular intervals. Into these slits, tooth-like metal strips 13 (Fig. 7) are inserted in such a manner that their tabs 14 protrude from the base mold (Fig. 6). Thereby, the end tab 14a on one side is longer than the one on the opposite side by the width of one mold piece. The metal strips used preferably consist of a soft iron sheet or of such a material which exhibits greater wear than the hard metal mold pieces. As can be seen at 15, Fig. 4, the intermittent insertion of the metal strips in successive slits with one long and short end tab 14 on the same side effects that the tabs 14 always are positioned in a joint at a right angle to the working direction of the die.

The mold pieces are reinforced by the tabs in the working direction, whereas the metal strips, serving as interlayers, by the partial insertion in the base mold and the subsequent soldering, are tightened in the best possible manner and thereby have a favorable reinforcing action. In order to avoid shifting of the interlayers upon soldering, they are spotwelded beforehand at the points 16.

The mold pieces 8 at the arched end zones also are reinforced by the interlayers, and the beveling 17 of the base mold (Fig. 6) counteracts lateral shearing forces on the mold pieces 8.

The hard metal mold pieces are inserted in the prepared base mold in the manner shown at 18, Fig. 2, and then are welded or soldered.

Fig. 8 shows a plate according to the present invention which is reinforced in the same manner with hard metal mold pieces. The working direction of the die is indicated by an arrow. The interlayers are in vertical position to the working direction. The plates are reinforced only in the central zone 19, and the end zones 20 remain without reinforcement.

A die whose head conforms to the finished briquette can also be reinforced in the same manner with hard metal pieces. The insertion of interlayers running vertically to the working direction of the die is not required thereby, but it is of advantage to provide the lateral contact surfaces of the pieces with a thin sheet metal insert before welding or soldering.

Since the interlayers running at right angles to the working direction of the die are made of soft iron, grooves are formed upon molding which are filled with coal and produce a higher shaping resistance without incurring wear of the base mold.

In order to increase or decrease the resistance, the number and/or width of the interlayers can be increased or decreased, respectively. The resistance joints can also be inserted additionally to the joints running at right angles to the working direction of the die, depending upon the coal to be briquetted. This can be accomplished in such a manner that the joints extend over the entire length of the mold or with interruptions.

In new and reground molds the interlayers can be shaped as deep grooves by means of sandblasting. In that case, the grooves immediately are filled with coal powder and thus exhibit the desired molding resistance.

Depending upon the characteristics of the coal and on the prevailing working conditions, the required molding resistance can be attained in the interior of other molds, in the manner as described, through insertion of soft iron interlayers for the purpose of the formation of grooves.

What I claim is:

1. A wear-resistant mold for the extrusion of coal briquettes, said mold comprising a plurality of portions confining the space into which the material to be extruded is inserted, in combination with lamellae secured to the inner surfaces of said portions and consisting of hard metal bars of shorter length than said mold portions, said lamellae having faces of rectangular shape, said lamellae being welded to each other and to said mold portions, the welding joints being disposed at right angles to the working direction of the mold and staggered with respect to one another.

2. The mold according to claim 1, wherein between said joints, disposed at right angles to the working direction of said mold, there are provided inserts consisting of a material having less wear resistance than the said lamellae.

3. The mold according to claim 1, wherein said surfaces are provided with grooves adapted to be filled with powdered coal during the operation of the mold.

4. The mold according to claim 2, wherein said interlayers consist of strips provided with tooth-like extremities, said strips being disposed on the mold surfaces and extending into the vertical joints between said lamellae.

References Cited in the file of this patent

UNITED STATES PATENTS

| | | |
|---|---|---|
| 1,114,870 | Ehrlick | Oct. 27, 1914 |
| 2,604,662 | Bodkin | July 29, 1952 |